United States Patent [19]
Brown et al.

[11] Patent Number: 5,509,279
[45] Date of Patent: Apr. 23, 1996

[54] COOLER BACKPACK WITH COMPARTMENTS

[75] Inventors: Douglas M. Brown, Monterey; Donald J. Erickson, Cupertino; Geoffrey H. Willis, Marina, all of Calif.

[73] Assignee: Blue Leaf Design, Inc., Monterey, Calif.

[21] Appl. No.: 255,650

[22] Filed: Jun. 8, 1994

[51] Int. Cl.$^6$ .................................................. F25D 3/08
[52] U.S. Cl. .......................... 62/457.5; 62/371; 62/457.7
[58] Field of Search ................................ 62/457.1, 457.2, 62/457.3, 457.4, 457.5, 457.7, 371, 529, 530

[56] References Cited

U.S. PATENT DOCUMENTS

| | | | |
|---|---|---|---|
| 450,527 | 4/1891 | Poyner | 62/457.7 |
| 3,482,418 | 12/1969 | Moore | 62/457.7 |
| 3,979,007 | 9/1976 | Thornbloom, Jr. | 220/23 |
| 4,266,407 | 5/1981 | Gibson | 62/371 |
| 4,280,336 | 7/1981 | Taylor | 62/457.5 |
| 4,351,165 | 9/1982 | Gottsegen et al. | 62/371 |
| 4,449,378 | 5/1984 | Thorpe | 62/371 |
| 4,577,475 | 3/1986 | Herrera | 62/457.1 |
| 4,655,052 | 4/1987 | Garcia | 62/441 |
| 4,662,188 | 5/1987 | Hullihan | 62/372 |
| 4,673,117 | 6/1987 | Calton | 224/151 |
| 4,704,875 | 11/1987 | Kieler | 62/372 |
| 4,721,237 | 1/1988 | Leslie | 224/148 |
| 4,767,039 | 8/1988 | Jacober | 224/151 |
| 4,858,444 | 8/1989 | Scott | 62/372 |
| 4,932,527 | 6/1990 | Hayes | 206/428 |
| 4,934,549 | 6/1990 | Allen | 220/4 |
| 4,941,603 | 7/1990 | Creamer | 224/148 |
| 4,988,216 | 1/1991 | Lyman | 383/74 |
| 5,005,679 | 4/1991 | Hjelle | 190/110 |
| 5,044,537 | 9/1991 | Bufalo | 224/245 |
| 5,062,557 | 11/1991 | Mahvi et al. | 224/153 |
| 5,064,088 | 11/1991 | Steffes | 220/339 |
| 5,095,718 | 3/1992 | Ormond et al. | 62/457.5 |
| 5,154,332 | 10/1992 | Williams et al. | 224/153 |
| 5,230,450 | 7/1993 | Mahvi et al. | 224/153 |
| 5,234,143 | 8/1993 | Mahvi et al. | 224/31 |
| 5,313,807 | 5/1994 | Owen | 62/457.3 |
| 5,329,787 | 7/1994 | Friday | 62/389 |

*Primary Examiner*—Henry A. Bennet
*Assistant Examiner*—William C. Doerrler
*Attorney, Agent, or Firm*—Lyon & Lyon

[57] ABSTRACT

A cooler backpack includes two or more separate storage compartments adjoining a central ice container. One of the compartments may be adapted to store cans or bottles of beverages in a plurality of recesses formed in one side of the ice container. Another of the compartments may be used for food storage and includes an insulated hard shell container having one or more shelves. The storage compartments and ice container fit within a durable insulated backpack. Apertures in the side of the backpack provide separate access to each of the storage compartments.

3 Claims, 3 Drawing Sheets

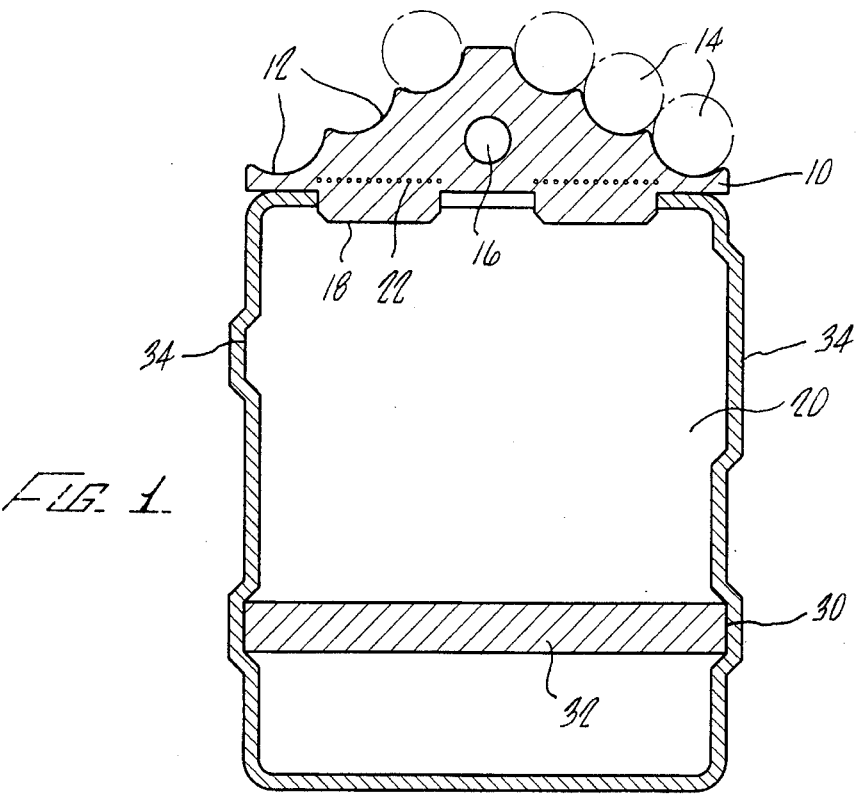
Fig. 1.
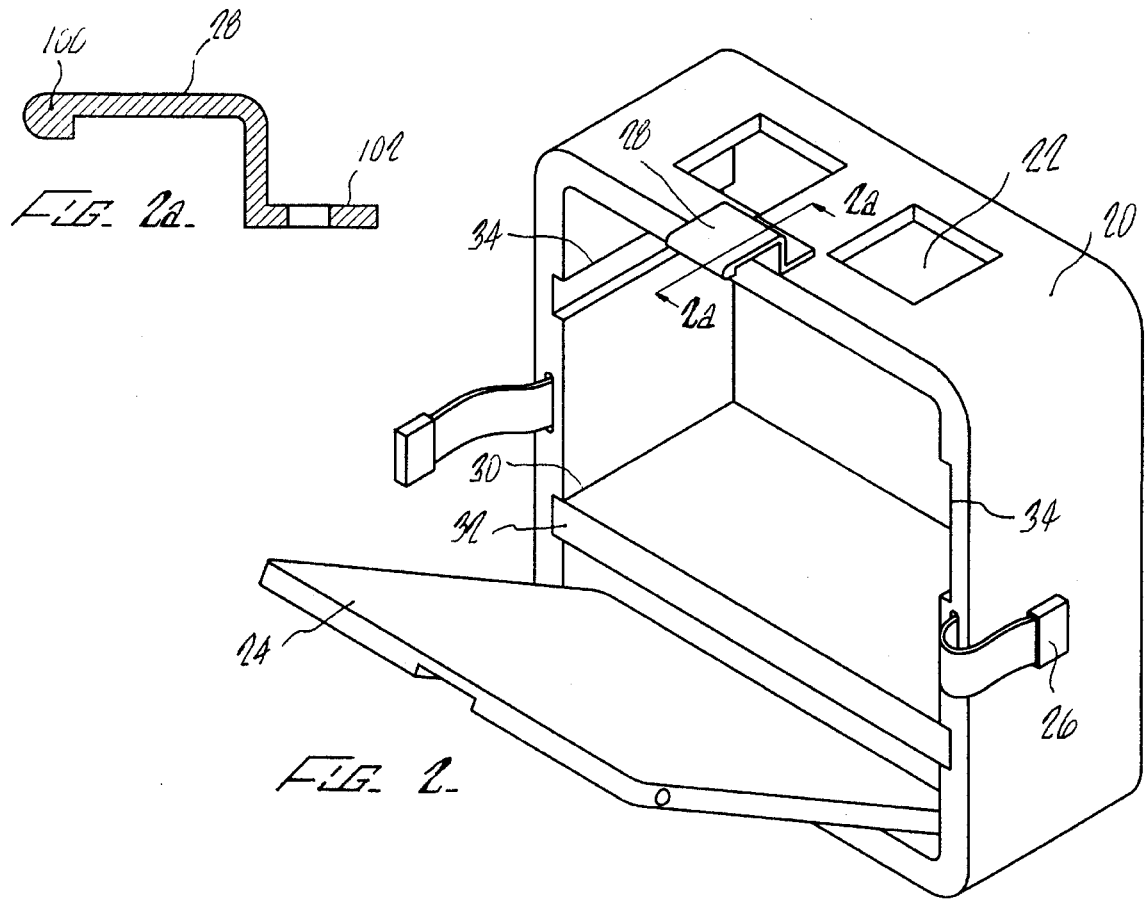
Fig. 2a.
Fig. 2.

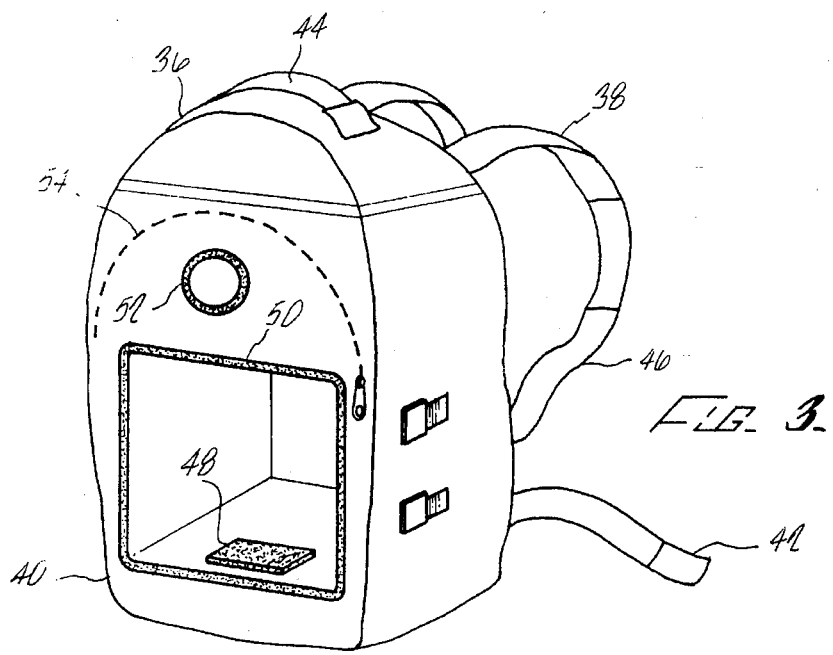
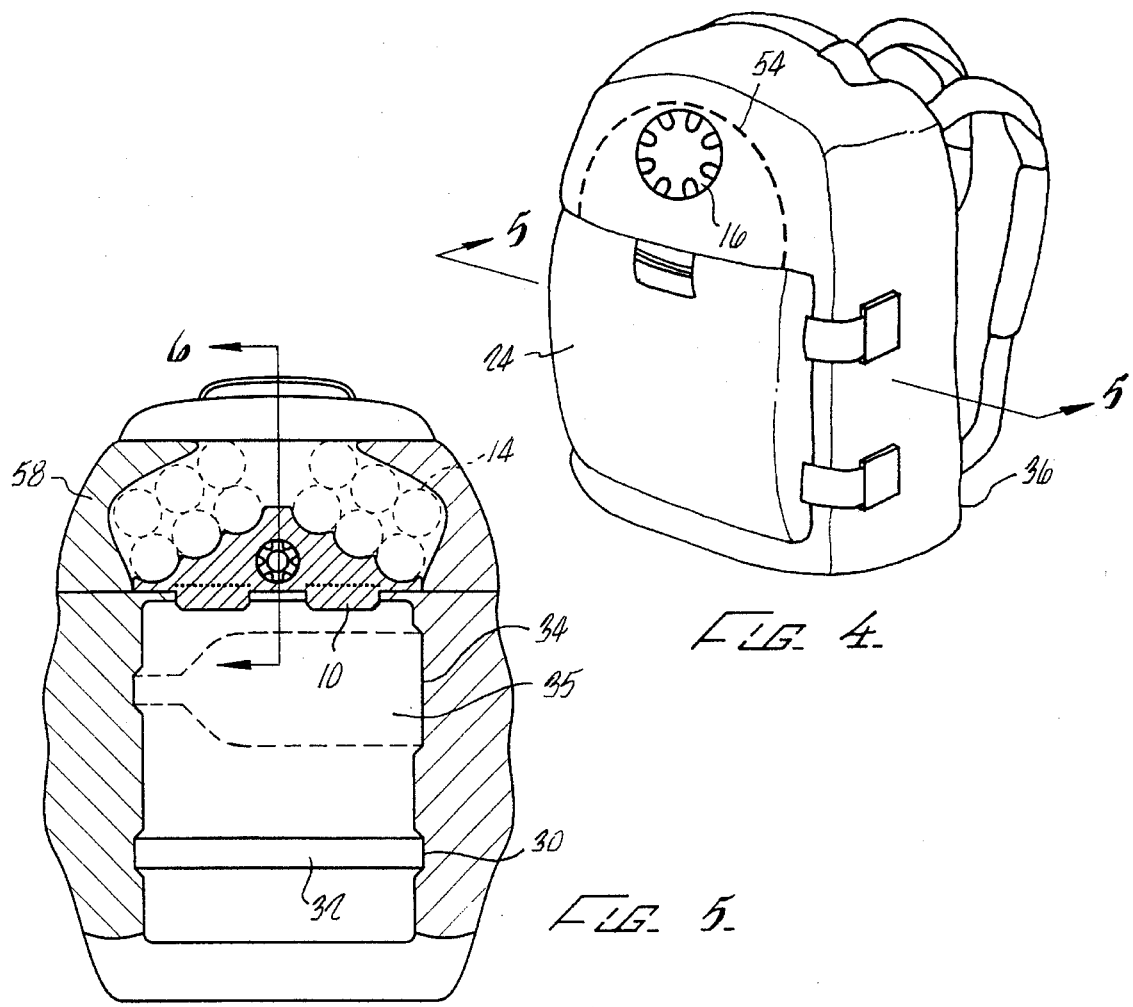
FIG. 3.
FIG. 4.
FIG. 5.

COOLER BACKPACK WITH COMPARTMENTS

BACKGROUND OF THE INVENTION

The present invention relates to a cooler having compartments for storing and keeping perishable food and beverages cold, which can be conveniently carried on a person's back.

Conventional coolers or ice chests typically consist of a large, rectangular box made of an insulated material, into which perishable food items and beverage containers may be placed. Bags of ice or, more commonly, loose ice cubes, may be placed in the cooler to keep the food and beverages cold. Coolers are most often used to keep 12-ounce cans of beverages cold during outdoor recreational activities such as picnics or the like.

Conventional coolers may be carried to the picnic area by grasping handles placed on the lid or sides of the cooler. However, this arrangement suffers from the disadvantage of being unwieldy and difficult for one person to carry comfortably. Carrying a conventional cooler over longer distances becomes a very intensive exercise.

Moreover, conventional coolers usually have only a single large storage area. Removal of certain items from these containers may be inconvenient; for example, the desired item may be located at the bottom of the container beneath chunks of ice and other food items, which must be removed from or shifted around in the container before the desired item can be reached. Further, the melting of ice placed within the container creates a layer of water at the bottom of the cooler which may ruin certain types of foods, such as sandwiches. Additionally, a person desiring a food or beverage item often must reach through loose ice cubes or cold water from melted ice with his or her hand, which has the dual effect of creating physical discomfort and of further melting the ice in the cooler, thereby diminishing the ability of the cooler to keep its contents cold. The use of a single area to store both food items and beverage containers is also inconvenient since beverages are typically retrieved more frequently than food items.

Therefore, there exists a need for a cooler which can be easily carried by one person, and which avoids the inconvenience associated with conventional coolers.

SUMMARY OF THE INVENTION

The present invention provides a cooler which can be conveniently carried on a person's back. Preferably, separate compartments are provided for holding food, beverage containers, and ice. An insulated food storage compartment advantageously has a hinged door, an ice container, and a plurality of recesses formed in the top of the ice container into which cans or bottles of beverages may be held. In a preferred embodiment, a food compartment is placed in the bottom of the backpack, with the ice container placed on top of the food compartment.

BRIEF DESCRIPTION OF THE DRAWING FIGURES

In the drawings, wherein similar reference characters denote similar elements throughout the several views:

FIG. 1 is a section view of an ice container and a food compartment useable with the present cooler backpack;

FIG. 2 is a perspective view of the food compartment of the cooler backpack of FIG. 1;

FIG. 2a is a cross-sectional view of a preferred securing latch.

FIG. 3 is a perspective view of a bag into which the present ice container and food compartment may be placed during use;

FIG. 4 is a perspective view of the cooler backpack ready for use;

FIG. 5 is a front section view of the cooler backpack taken along line 5—5 of FIG. 4;

DETAILED DESCRIPTION OF THE PREFERRED EMBODIMENT

Figure 6:
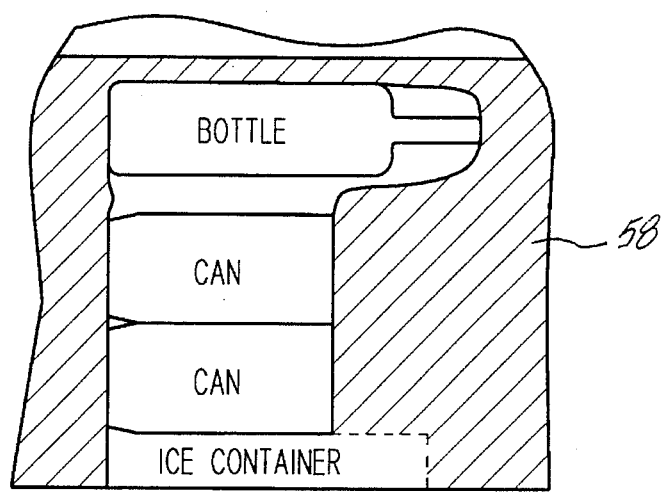
FIG. 6 is a side section view of the top portion of the cooler backpack taken along line 6—6 of FIG. 5.

Turning now to the drawings, FIG. 1 shows two compartments adapted for use with a cooler backpack. A waterproof ice container 10 is formed of plastic or similar material thin enough to be thermally conductive. The waterproof ice container 10 may be formed in a variety of shapes, but is preferably pyramidal or rectilinear. Using a pyramidal shape allows more cans or bottles to be stored while limiting the width of the backpack, an important consideration with backpacks. Furthermore, the pyramidal shape aids in keeping the ice stored therein longer-lasting. The ice container 10 includes a plurality of concave recesses or cavities 12 on its upper surface which are adapted to receive cans or bottles of beverages 14 and allow them to be balanced within the cavities 12 on the top of the container 10 in contact with the container 10, so that the cans or bottles 14 are kept cold. As shown in FIG. 1, the ice container 10 may be formed in the general shape of an isosceles triangle, with six recesses 12 formed as a series of steps on both angled faces of the triangle. The ice container 10 can also have a back surface that is curved to better conform to the shape of the back of the person wearing the backpack.

Ice may be placed within the ice container 10 through an opening 16 having a closeable cap, preferably disposed on one side of the container 10. The cap may be provided with a valve for a flexible tube, so that liquid within the ice container 10 may be drained. This valve also permits the ice container 10 to be used to store a beverage, which the user may drink through the valve and flexible tube.

Two or more protrusions 18 are located on the bottom surface of the ice container 10, and allow the ice container to be engaged with slots or openings 22 in the top surface of a food compartment 20, as shown in FIG. 1.

Referring to FIG. 2, the food compartment 20 is formed in the shape of a box having a door 24 hinged at its lower edge on a horizontal axis. The protrusions 18 on the bottom of the ice container 10 advantageously extend through the openings 22 into the interior of the food compartment 20. The openings 22 and protrusions 18 allow cold air from the ice container 10 to enter via convection into the food compartment 20, to help keep food items placed within the food compartment 20 cold. The engagement of the ice container 10 with these openings 22 also permits the ice container 10 to sit securely on the top of the food compartment 20 while the backpack is handled.

The food compartment 20 is preferably formed of an insulating, hard shell material that may be easily cleaned. For added convenience, the compartment 20 may be formed in a size, and of a material, such that the entire compartment may be easily cleaned in a conventional dishwasher. The food compartment 20 has one or more straps with side release buckles 26 attached thereto, which can be engaged with buckles on the backpack, to secure the compartment 20 to the backpack. The food compartment 20 can also have a back surface that is curved to better conform to the shape of the back of the person wearing the backpack.

Access to the food compartment 20 is provided through a hinged door 24. The hinge (not shown) is formed by protrusions at the lower corners of the door 24 inserted into depressions in the food compartment 20. The door 24 may also be detachable from the food compartment 20. Preferably, the door 24 has a double wall construction containing dead air space, so that the door 24 is thermally insulated.

The door 24 may be fastened closed to the food compartment 20 by a securing latch 28 which may be sprung away from the doorway to open the door 24 is open. A cross-sectional of a preferable securing latch 28 is shown in FIG. 2a. When the door 24 is closed, it strikes curved edge 100 of latch 28, which pushes up latch 28 and forces the door 24 into the space formed by the latch 28. The bias required to keep door 24 closed is provided by end 102 that acts as a stiff leaf-spring. The end 102 is fastened to the food compartment 20.

The interior of the food compartment 20 includes one or more sets of horizontal grooves 30 into which shelves 32 may be placed to divide the interior of the food compartment. The shelves 32 provide additional surfaces to support food items placed within the food compartment 20, and also assist in positioning food items toward the top of the compartment, closer to the ice container 10. The shelf 32 may itself be constructed as a thin container or tray for holding additional ice cubes to further assist in cooling the interior of the food compartment 20. Additional grooves 34 may be adapted to receive a standard two liter beverage bottle 35 and conveniently hold it securely in a horizontal position, to prevent the bottle from shifting inside the food compartment. The food compartment 20 may also be provided with one or more inflatable bladders (not shown), which can be filled with air and inserted into the interior of the compartment to prevent the contents from shifting around during transit.

The ice container 10 and food compartment 20 may be conveniently carried within the backpack illustrated in FIG. 3. The backpack includes a bag 36 having shoulder straps 38 which enable the bag 36 to be worn on a person's back like a conventional backpack. The bag 36 is preferably formed of a layer of foam or any other thermally insulating layer. The foam is protected by a heavy durable fabric, e.g., nylon or vinyl. The bag 36 has a reinforced bottom 40 to support the weight of the compartments and their contents. The bag 36 may also include any number of additional pockets for storing additional items and accessories, and may also have a hip belt or waist belt 42 to further secure the bag in place on a person's back, as well as one or more carrying handles 44 by which the bag can be lifted and carried by hand. Furthermore, the foam used in the bag is washable, or the bag is lined on the inside with a vinyl or coated fabric so that the inside surface is washable.

The bag 36 may be provided with release buckles or fasteners 46 on its sides, which can be engaged with the buckles attached to the food compartment 20. One or more "Velcro" fasteners 48 may also be disposed on the inner surface of the bag, to engage corresponding "Velcro" fasteners disposed on the exterior of the food compartment 20 placed in the bag, to further secure the compartment 20 in place within the bag.

To provide access to the food and beverage items, the bag 36 includes a large rectangular aperture or opening 50 on the back face of the bag. A smaller opening 52 is located on the front of the bag slightly above the larger opening 50. A semicircular zippered opening 54 is also provided above the small opening 52. The edges of these openings are reinforced to prevent tearing or other damage, and to provide further support.

To use the cooler backpack, the food compartment 20, the ice container 10 and cans or bottles of beverages 14 may be stacked within the bag 36. The ice container 10 sits on the top of the food compartment 20, as shown in FIGS. 4 and 5, with the cap 16 on the ice container 10 projecting through the smaller opening 52 of the bag 36. Thus, the cap 16 may be used and ice or a liquid may be inserted into or drawn from the ice container 10 while in the bag. The space in the bag between the top of the ice container 10 and the top of the bag 36 creates a compartment for storing cans or bottles of beverages 14. This compartment will be kept cold by conduction and convection from the top surface of the ice container 10.

The larger opening 50 on the bag 36 is positioned so that the door 24 to the food compartment 20 may be easily opened and closed while the food compartment 20 is in place in the bag 36. The opening 50 should approximate the size of the door 24 of the food compartment 20, so that the ice container 10 and any cans or bottles of beverages 14 placed on top of the ice container 10 cannot fall out of the bag 36 through the space between the food compartment 20 and the edges of the larger opening 50.

The zippered opening 54 provides access to the cans or bottles of beverages 14 placed in the recesses 12 on the top of the ice container 10. The dimensions of the bag should be such that cans or bottles of beverages may be stacked in two or more layers on top of the ice container 10, as shown in FIG. 5. Alternatively, a smaller bag could provide space for just one layer of cans or bottles. The zippered opening 54 preferably provides access to the lowest layer of cans or bottles in direct contact with the ice container 10, so that the coldest beverages in direct contact with the ice container 10 are removed before relatively warmer beverages in the upper rows. Removal of a can or bottle from the lowest layer causes another can or bottle to drop in its place into contact with the ice container 10, to provide increased cooling and ease of access, as indicated by arrow 56 in FIG. 7.

Figure 7:
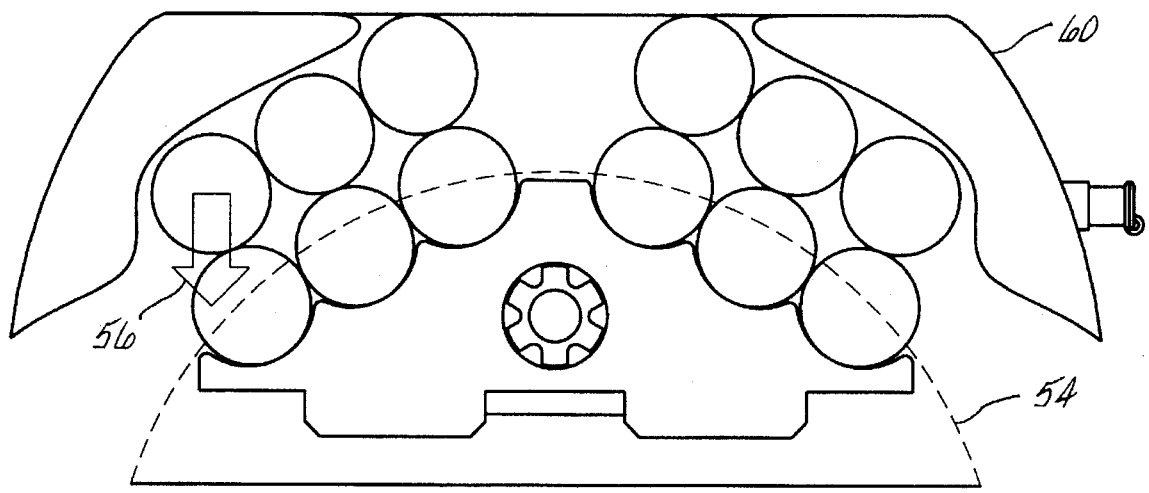
FIG. 7 is a front elevation view, in part section of the portion of the cooler backpack shown in FIG. 6.

The interior of the bag adjacent the zippered opening 54 may be lined with additional layers of expansive and compressive foam 58, as shown in FIG. 5 and FIG. 6. Equivalently, one or more inflatable bladders 60 formed of airtight plastic bags which can be filled with air may be used, as shown in FIG. 7. The inflatable bladders 60 or foam layers 58 press against the cans or bottles 14 placed in the cavities 12 on the ice container 10, to secure the cans or bottles 14 against the ice container 10 to increase conductive cooling of the beverages and to prevent the layers of cans or bottles from shifting within the pack while the backpack is being moved.

In use, the ice container 10 may be filled with water and then frozen. Alternatively, a frozen liquid beverage may be used which the user may later drink after it has melted. The cap 16 is large enough to allow ice cubes to be poured into the container 10. Perishable food items or beverage containers may be arranged within the food compartment 20 as desired. When in place, the food compartment 20 is located towards the bottom of the bag 36, and the ice container 10 rests on top of the food compartment 20, with the protrusions 18 on the bottom of the ice container 10 extending slightly into the food compartment 20 via openings 22. Cans or bottles of beverages 14 may be placed in stacks in the cavities 12 on top of the ice container 10. The positioning of the ice container 10 in a central location within the bag 36 between the food compartment 20 and the beverage cans or bottles 14 permits the ice container 10 to cool both the contents of the food compartment 20 and the beverages 14 on top of the ice container 10. The entire backpack may then be conveniently strapped to a person's back and transported to the picnic or recreation area. The user's hands remain free. During transit, the placement of the beverage containers 14 in the upper compartment advantageously puts the greatest weight high upon the person's back, to ease the carrying of the load. The present cooler backpack can carry chilled food and drinks over difficult terrain, far more easily than using a conventional cooler.

Thereafter, the food and beverages may be selectively removed from and replaced in the various portions of the backpack without the need to disassemble the backpack. For example, beverages 14 may be removed from the backpack by unzipping the zipper 54 and removing the desired cans or bottles, without disturbing the contents of, or permitting cold air to escape from, the food compartment 20. Conversely, items may be removed from the food compartment 20 without disturbing the beverages 14 stacked on top of the ice container 10, and without the need to remove the food compartment 20 from the bag. Further, the contents of the ice container 10 may be imbibed directly by inserting a flexible tube into a valve on the cap 16. When the picnic or recreational event is over, the various doors, cap and zippers may be closed, and the backpack may be easily transported from the site.

Although discussed with reference to the preferred embodiment illustrated in the attached drawing figures, the cooler backpack may be configured in any number of equally advantageous alternative arrangements. In particular, the ice container 10 and food compartment 20 may be placed within the bag 36 in a manner rotated 90° around a vertical axis from the present configuration, so that the food compartment door 24 and the zippered opening 54 open from the side of the backpack, rather than the front. Additionally, the backpack may be provided with as many compartments of different sizes and shapes as desired; for example, a large backpack might contain four or more storage compartments arranged adjacent a single rectangular ice container, or with three compartments arranged around a triangular ice container, in any other desirable configuration. Conversely, additional ice containers may be added to increase the capability of the backpack to keep food items cold; for example, two or more ice containers may be arranged in contact with a single compartment. Numerous additional modification may be made to the present invention which will fall within the scope and spirit of the present invention as set forth in the appended claims.

We claim:

1. A cooler, comprising:

an insulated compartment;

a container for storing a coolant material, positioned to be thermally conductive with the insulated compartment;

a plurality of recesses on the container, each adapted to receive and hold at least one beverage container;

a backpack bag having at least one carrying strap, and adapted to hold the insulated compartment, the container, plurality of beverage containers, wherein the beverage containers are held within the bag in a storage area formed by the recesses on the top of the container and the interior top of the bag;

an expandable layer disposed inside the bag to hold the beverage containers in contact with the top of the container, the expandable layer comprising a layer of foam and an inflatable bladder.

2. A cooler, comprising:

an insulated compartment;

a container for storing a coolant material, positioned to be thermally conductive with the insulated compartment;

a plurality of recesses on the container, each adapted to receive and hold at least one beverage container;

a backpack bag having at least one carrying strap, and adapted to hold the insulated compartment, the container, and a plurality of beverage containers; and at least one inflatable bladder disposed inside the insulating compartment for holding items placed within the compartment against movement.

3. A cooler, comprising:

an insulated storage compartment having at least one aperture disposed on an upper surface thereof;

a hinged door disposed on a side of the compartment providing access to the interior of the compartment;

a watertight container for holding ice or a chilled liquid and having at least one protrusion extending through the aperture on the upper surface of the storage compartment into the interior of the storage compartment;

a removable cap on the waterproof container;

a plurality of recesses formed in the upper surface of the watertight container, each adapted to receive a beverage container;

a backpack adapted to receive the insulated storage compartment, the watertight container, and a plurality of beverage containers, comprising:

shoulder straps;

a large aperture in the bag permitting access to the hinged door of the insulated storage compartment, a small aperture disposed above the large aperture permitting access to the removable cap of the waterproof container, a zippered aperture permitting access to at least some of the beverage containers, and an expansive layer removably affixed to the interior of the bag and disposed to hold the beverage containers in contact with the recesses in the upper surface of the waterproof container.

\* \* \* \* \*